Oct. 23, 1956 R. L. NEWSOM 2,767,877

RIVET ADAPTED TO SECURE TWO SHEETS IN SPACED RELATIONSHIP

Filed Jan. 11, 1954

*INVENTOR.*

ROBERT L. NEWSOM

*BY*

William L. Lane

ATTORNEY

United States Patent Office 2,767,877
Patented Oct. 23, 1956

2,767,877

RIVET ADAPTED TO SECURE TWO SHEETS IN SPACED RELATIONSHIP

Robert L. Newsom, Manhattan Beach, Calif., assignor to North American Aviation, Inc.

Application January 11, 1954, Serial No. 403,255

5 Claims. (Cl. 218—29)

This invention pertains to a rivet and more particularly to a rivet of the spacer type.

This is a growing commercial requirement for a satisfactory fastener usable with spaced parts. For example, metal sheets may be provided which must be rigidly fastened together yet spaced apart a predetermined amount. In many cases the structure will include a honeycomb or other low density core between the spaced sheet members. Obviously, the conventional rivet will not provide any rigid spacing device inbetween the exterior sheets of such a construction. It has been found to be awkward, expensive and unreliable to attempt to provide a spacer between such spaced sheets and then rivet the assembly together in the conventional manner. With the presence of a honeycomb core it is impossible to provide a spacer after the exterior sheets are in position. Another important consideration in many designs is that the fastener be of the blind type so that it is unnecessary to have access to both sides thereof when the rivet is installed.

Obviously there is need for a fastener which will both secure the outer members together and provide a rigid spacing means. Although both gripping and spacing the sheets, the fastener should not be designed to exert any lateral force against the spaced sheets at the locations of the apertures therethrough, because damage to the sheets would result. Of course, a rivet of optimum design should be simple to fabricate and install and should have a minimum number of parts.

Accordingly, it is an object of this invention to provide a rivet of the spacer type.

Another object of this invention is to provide a rivet which expands internally between spaced sheets and at one end for holding the sheets together.

A further object of this invention is to provide a rivet for spaced sheets and of the blind type.

Yet another object of this invention is to provide a rivet which is set merely by pulling a pin member through a sleeve member.

An additional object of this invention is to provide a rivet which expands at one end to form a head and at an intermediate portion to provide a spacer, but is not expanded at the location of openings in sheet members held together.

A still further object of this invention is to provide a rivet of the spacer type which is economical to fabricate and install, and has a minimum number of parts.

These and other objects will become apparent from the following detailed description taken in connection with the accompanying drawings in which.

Figure 1:
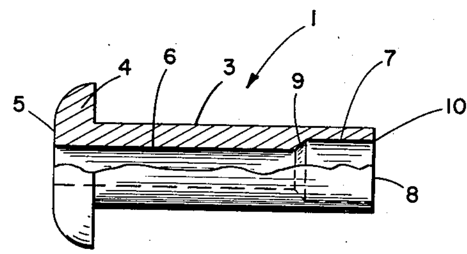
Fig. 1 is an elevational view, partially in section, of the sleeve portion of the rivet.
Figure 2:
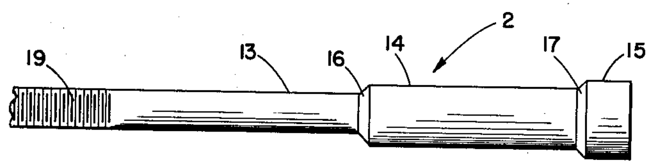
Fig. 2 is an elevational view of the pin member.

Referring to the drawing, the rivet of this invention is made up of two parts which are a sleeve or collar 1, as shown in Fig. 1, and a pin 2 illustrated in Fig. 2. Generally speaking, the pin is adapted to fit within the sleeve whereupon it may be pulled through the sleeve to expand the sleeve at two places. This expansion of the sleeve is devised to provide an upset end for a rivet head, and also to provide an intermediate spacer portion.

Sleeve member 1 has a substantially cylindrical form preferably with a constant exterior diameter 3 except for a head 4 provided at end 5 thereof. The interior of the sleeve is separated into portions of two diameters. Intermediate portion 6 includes the central portion of the sleeve and may extend to end 5 thereof. End portion 7 is of slightly larger diameter than that of portion 6 and may extend to end 8 of the sleeve. This provides a shoulder 9 between these two adjoining interior portions of the sleeve, and a second shoulder 10 at the location of the end of the portion of larger interior diameter of the sleeve.

Pin 2 is constructed to have a portion of relatively small diameter 13, of intermediate diameter 14, and of a larger diameter 15 This provides shoulders 16 and 17 which are preferably tapered as illustrated. The sleeve shoulders may also be tapered if desired. An extension of portion 13 may provide a grip portion 19 which should be no greater in diameter than that of portion 13.

Figure 3:
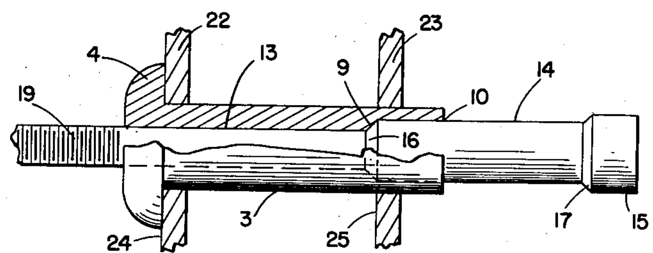
Fig. 3 is a sectional view showing the pin and sleeve assembly in position for riveting.

Prior to a riveting operation, the pin is adapted to be assembled in the sleeve. The pin may be positioned as shown in Fig. 3 with shoulder 16 of the pin adjacent shoulder 9 of the sleeve, or these shoulders may be left slightly spaced. A snug fit is desirable between the portions of the pin and the sleeve so engaged so that they will not be readily displaced and separated, which will minimize storage and handling problems. Of course, this snug fit does not expand the exterior portions of the sleeve when the pin is in this position. Note that grip porton 19 extends beyond the end of the sleeve when the pin is assembled therein in this manner.

As illustrated in Fig. 3, the pin and sleeve assembly is adapted to fit through aligned apertures of equal diameter in spaced sheets 22 and 23. These members may be entirely separated, as shown, or a core of honeycomb or other construction may be provided between the sheets. The under surface of head 3 of the sleeve is adapted to engage outer surface 24 of sheet 22 when the rivet is in this position. The locations of the shoulders of the pin and the sleeve in relationship to each other and to the head 3 of the sleeve are critical and must be correlated with the particular thickness of the spaced sheets used, and the spacing between the two sheets. Shoulder 9 of the sleeve should be located substantially in alignment with the under surface 25 of sheet 23.

Figure 4:
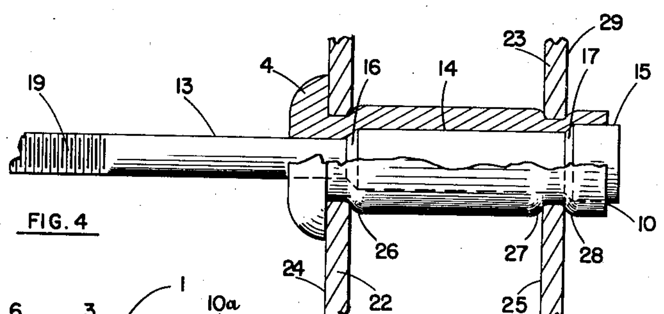
Fig. 4 illustrates the assembly of Fig. 3 after the sleeve has been expanded by the pin.

The next step in riveting is to grip portion 19 of the pin by any suitable tool of the type well known in the art, and pull axially on the pin. This moves the pin further within the sleeve so that the pin assumes the position shown in Fig. 4. When such movement takes place, shoulder 16 of the pin expands the intermediate portion of the sleeve from the location of shoulder 9 of the sleeve. The exterior of this part of the sleeve between the two sheet metal members 22 and 23 is therefore no longer of its original size. Instead the exterior has been enlarged to form shoulders 26 and 27 adjacent the inner surfaces of members 22 and 23. The sleeve thereby provides a spacer which holds the sheets apart.

During this movement of the pin, shoulder 17 of the pin engages outer shoulder 10 of the sleeve and expands the sleeve on the outer side of sheet 23. In this manner the sleeve is upset so as to form a head 28 on the exterior of the blind side thereof. The spacing between shoulders 16 and 17 of the pin should be such that when the entire intermediate portion between the two sheet metal members is expanded the sleeve will also be expanded exteriorly of sheet 23 down to surface 29 thereof. At the same time, shoulder 16 of the pin does not pass beyond the location of sheet 22 while shoulder 17 of the pin does not pass beyond the location of sheet 23. This means that the pin is given a head and a spacer portion by reason of the movement of the pin, but there is no expansion at the locations of the apertures through the sheets. Thus, a tight fit is obtained and a spacer is provided, but there is no damage to the sheets of the location of the rivet. The expansion is only at the desired places so that maximum holding power and spacing is obtained.

Normally the portion of the pin projecting beyond end 5 of the sleeve will be removed so that the pin is substantially flush with the end of the sleeve. The end of the pin, therefore, may be cut or broken off to the desired length. It is possible to drive the pin back out of the sleeve if it is desired to form a hollow fastener although the pin will usually be left within the sleeve so that it forms an integral part of the fastener. Of course, the interior of the sleeve and the exterior of the pin need not be exactly round, as illustrated, but the shoulders must interferingly engage as set forth to expand the sleeve.

Figure 5:
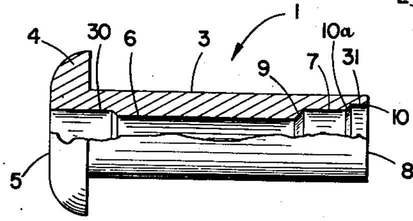
Fig. 5 illustrates a modified sleeve design.

According to the modification of Fig. 5 there is a slight relief in the interior diameter at 30 at end 5 of the sleeve, and at 31 at end 8. This is optional and does not affect the basic operation of the rivet. Relief 31 will enable the larger portion of the pin to more easily enter the end of the sleeve for performing its expansion of the sleeve. This in effect divides shoulder 10 so as to provide an additional surface 10*a*, but the action of this stepped shoulder in expanding the sleeve is exactly as for the previously described embodiment. Relief 30 will assure that there is no tendency to expand the sleeve at the location of sheet 22, whereby any possibility of damage to this sheet is precluded. The latter relief should not extend beyond a location corresponding to the inner surface of sheet 22 so that the spacer portion of the sleeve will be properly expanded.

It is thus apparent that I have provided an improved spacer type rivet which in one simple operation provides a head and a spacer portion on a sleeve member inserted between spaced sheet members. There is no expansion at the location of the sheets themselves whereby the sheets are not damaged by the fastener. On the other hand, the spacer portions and head portions tightly grip the sheets so that there is maximum holding capacity and maximum spacing action. The rivet will work as a blind fastener and is made from only two parts whereby handling, storage and fabrication are facilitated.

The foregoing detailed description is to be clearly understood as given by way of illustration and example only, the spirit and scope of this invention being limited only by the appended claims.

I claim:

1. In combination with spaced sheet members, a rivet comprising a hollow sleeve member of constant exterior diameter adapted to project through openings in said spaced sheet members, said sleeve having a head on one end thereof adapted to engage the exterior surface of the first of said sheets, the interior of said sleeve having a first shoulder disposed substantially in alignment with the interior surface of the second of said sheets and a second shoulder beyond the exterior surface of said second sheet when said head so engages the exterior surface of said first sheet; and a pin member adapted to extend through said sleeve, said pin having a first shoulder adapted to engage said first sleeve shoulder whereby axial movement of said pin expands said sleeve between the interior surfaces of said sheets, and a second shoulder adapted to engage said second sleeve shoulder upon such movement of said pin for expanding said sleeve exteriorly of said second sheet, said pin shoulders being spaced substantially the distance between said interior surface of said first sheet and said exterior surface of said second sheet, whereby when said first pin shoulder is adjacent the interior surface of said first sheet, said second pin shoulder is adjacent the exterior of said second sheet.

2. A rivet comprising a hollow sleeve member, having an enlarged head on one end thereof, the interior of said sleeve having a first diameter for intermediate portions thereof, and a second larger diameter at the end portion thereof remote from said head portion, thereby defining a shoulder between said first and said second diameters of said sleeve, said sleeve being further provided with a second shoulder at the termination of said second diameter of said sleeve; and a pin member adapted to extend through said sleeve, said pin member having a first shoulder adapted to engage said first shoulder of said sleeve and of a diameter substantially complementary to said second diameter of said sleeve, and a second shoulder adapted to engage said second shoulder of said sleeve and of a diameter greater than that of said second diameter of said sleeve, whereby upon axial movement of said pin, said pin shoulders expand said sleeve, said pin shoulders being so axially spaced that when said first pin shoulder is moved to a position where it is closely spaced from said head portion of said sleeve said second pin shoulder is closely spaced from the initial location of said first shoulder of said sleeve so that said sleeve is expanded at said end portion thereof remote from said head by said second pin shoulder and at a location intermediate the ends thereof by said first pin shoulder.

3. In combination with spaced sheet members to be riveted, a rivet comprising a hollow sleeve member of constant exterior diameter adapted to project through openings in said spaced sheet members, said sleeve having a head on one end thereof adapted to engage the exterior surface of the first of said sheets, the interior of said sleeve having a first shoulder disposed substantially at the interior surface of the second of said sheets, and a second shoulder beyond the exterior of said second sheet; and a pin member adapted to extend through said sleeve, said pin having a first shoulder adapted to engage said first shoulder of said sleeve, and a second shoulder adapted to engage said second shoulder of said sleeve, said pin shoulders being spaced an axial distance such that upon axial movement of said pin to a position where said first pin shoulder is adjacent the interior surface of said first sheet member, and said second pin shoulder is adjacent the exterior surface of said second sheet member, whereby said sleeve is expanded only exteriorly of said second sheet and between the interior surfaces of said first and second sheets.

4. A rivet comprising a hollow cylindrical sleeve member, said sleeve having a head on one end thereof, the interior surface of said sleeve having a first annular shoulder intermediate said head and the opposite end portion of said sleeve, said sleeve being further provided with a second annular shoulder communicating with said interior surface and disposed at said opposite end portion, said sleeve having one interior diameter for portions thereof connecting with said first shoulder and extending toward said head, and a second and larger internal diameter between said first and said second shoulders; and a pin member adapted to be inserted in said sleeve, said pin having a first annular shoulder for engagement with said first sleeve shoulder for expanding adjacent portions of said sleeve upon axial movement of said pin relative thereto toward said head, said first pin shoulder having an outside diameter substantially complementary to said larger interior diameter of said sleeve, and a second larger pin shoulder for engaging said second sleeve shoulder for similarly expanding other portions of said sleeve at said opposite end portion upon such axial movement of said pin, said pin shoulders being spaced an amount with respect to said sleeve such that when said first pin shoulder has been moved to where it approaches but is spaced from said head, said second pin shoulder is disposed in a position where it approaches but is spaced from said location of said first sleeve shoulder, whereby said sleeve is expanded between said location of said first sleeve shoulder and said head portion and between said location of said second sleeve shoulder and said first sleeve shoulder.

5. A spacer rivet comprising a tubular sleeve having a head on one end thereof, the interior of said sleeve having a first diameter for an intermediate portion thereof extending from a location spaced from said head to a location spaced from said opposite end, a second diameter larger than said first diameter between said location spaced from said head to said firstly mentioned end of said sleeve, a third diameter larger than said first diameter between said opposite end and said location spaced therefrom so as to define a first shoulder at the edge of said first diameter, and a fourth diameter between said third diameter and said opposite end so as to define a shoulder between said third diameter and said fourth diameter; and a pin adapted to be pulled through said sleeve for expanding spaced portions of the same, said pin having a portion no larger in diameter than said first sleeve diameter extending through said sleeve, thereby providing a means for pulling said pin through said sleeve, an adjoining portion substantially complementary to said third sleeve diameter so as to define a first pin shoulder between said pin diameters, and a remaining portion substantially complementary to said fourth sleeve diameter defining a second pin shoulder between said adjoining portion and said remaining portion, said pin shoulders being spaced such that when said pin has been pulled through said sleeve to a position where said first pin shoulder is adjacent but spaced from said sleeve head, said second pin shoulder is adjacent but spaced from said location of said first sleeve shoulder.

References Cited in the file of this patent

UNITED STATES PATENTS

| | | |
|---|---|---|
| 2,466,811 | Huck | Apr. 12, 1949 |
| 2,538,623 | Keating | Jan. 16, 1951 |
| 2,545,752 | Singleton | Mar. 20, 1951 |
| 2,546,602 | Keating | Mar. 27, 1951 |